UNITED STATES PATENT OFFICE.

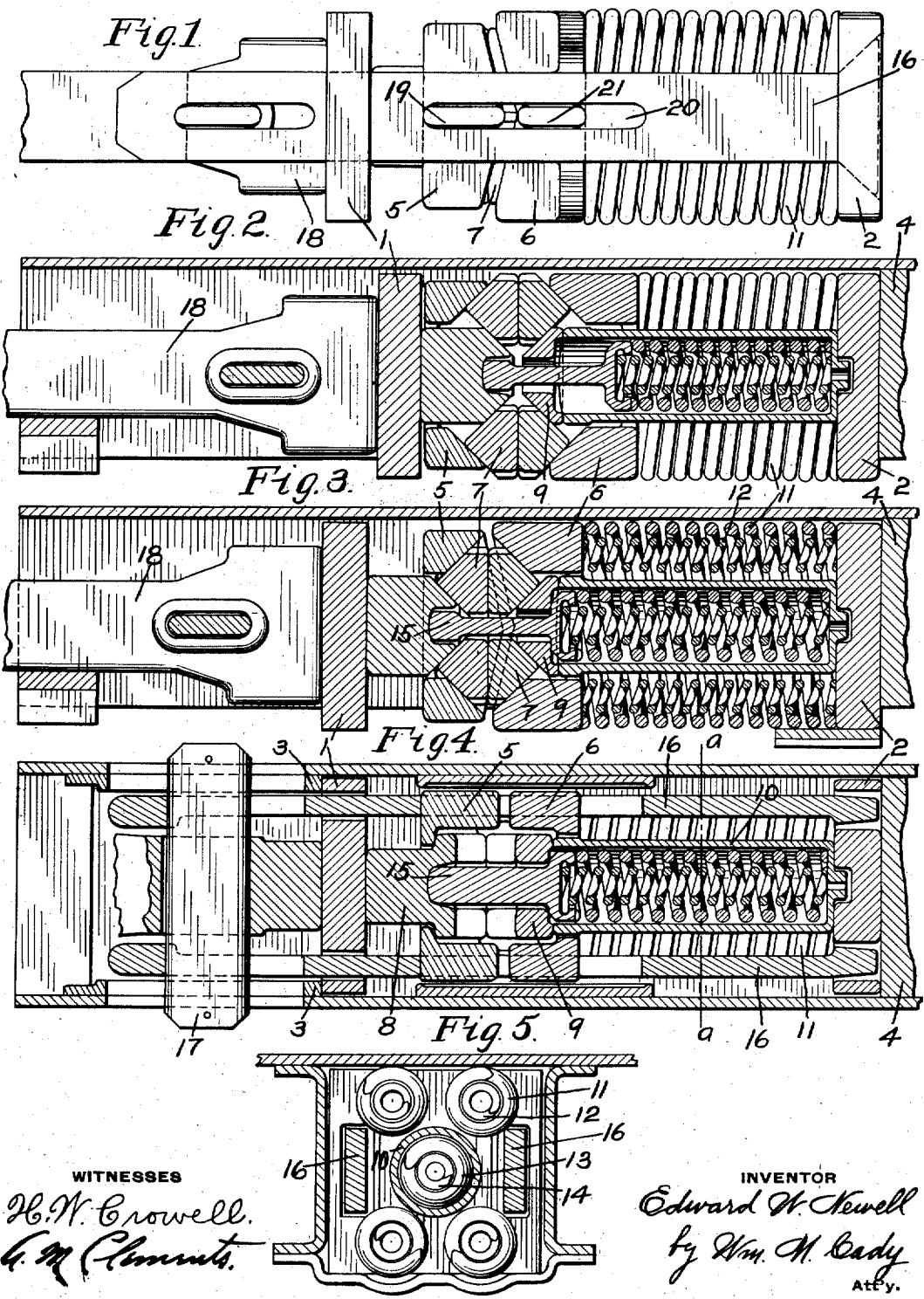

EDWARD W. NEWELL, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FRICTION DRAFT-GEAR.

1,196,016. Specification of Letters Patent. Patented Aug. 29, 1916.

Application filed August 17, 1915. Serial No. 45,879.

*To all whom it may concern:*

Be it known that I, EDWARD W. NEWELL, a citizen of the United States, residing at Pittsburgh, in the county of Allegheny and State of Pennsylvania, have invented new and useful Improvements in Friction Draft-Gear, of which the following is a specification.

This invention relates to friction draft gear, more particularly as employed on railway cars for absorbing and dissipating shocks due to buffing and draft stresses.

One object of my invention is to provide an improved friction draft gear of the type in which friction resistance is developed in a direction transverse to the line of draft.

Another object of the invention is to increase the power of the draft gear in the release movement.

In the accompanying drawing; Figure 1 is a side elevation of a friction draft gear constructed in accordance with my invention; Fig. 2 a vertical, longitudinal sectional view thereof, showing the parts under a buffing stress; Fig. 3 a similar sectional view showing the parts in release position; Fig. 4 a horizontal section of the draft gear; and Fig. 5 a transverse section on the line *a—a* of Fig. 4.

According to my invention, the draft gear may comprise front and rear follower plates 1 and 2, the front follower plate 1 being adapted to engage stops 3 and the rear follower plate a stop 4, which may be the bolster center casting. Between the followers are mounted front and rear members 5 and 6 having oppositely inclined friction faces adapted to engage corresponding friction faces of friction blocks 7, preferably formed of similar half sections, to permit automatic adjustment of the parts where necessary. Bearing against the front follower plate 1 is a centrally disposed plunger wedge 8 having oppositely inclined friction faces adapted to engage corresponding friction faces of the friction blocks 7 and a rear plunger wedge 9 arranged in alinement with the plunger wedge 8 is also provided with oppositely inclined friction faces adapted to engage similar friction faces of the friction blocks 7. A tubular member 10 engages the rear face of the plunger wedge 9 and at the rear end is adapted to engage the rear follower plate 2. Interposed between the rear friction member 6 and the rear follower plate 2 are coil springs which may consist of four sets of nested springs, each set having an outer spring 11 and an inner spring 12.

Within the tubular member 10 are nested springs 13 and 14 adapted to bear at the rear against the rear wall of the tubular member 10 and at the front end against a member 15 which extends centrally between the friction blocks 7 and engages in a socket formed in the front plunger wedge 8.

Either the link or yoke type of draft gear attachment may be employed, but in the drawing I have shown links 16 extending through slots in the front follower 1 and the front and rear friction members 5 and 6. The rear end of each link 16 is in the form of a wedge shaped head adapted to engage within a corresponding slot in the rear follower plate 2, as shown in Fig. 1 of the drawing, and the front ends of the links are slotted to receive a key 17 for connecting the links to the draw bar 18. At opposite sides, the front member 5 is provided with key shaped tongues 19 adapted to engage within slots 20 in the links 16 and the rear member 6 may also be provided with similar tongues 21 adapted to engage within the slots 20. The draft springs 11 and 12 are preferably placed under initial compression, and for this purpose the slots 20 are so cut that it is necessary in assembling the gear to compress the springs by moving the member 5 rearwardly before the tongues 19 can enter the slots 20. In this connection, it may be stated that in assembling, the friction members and the draft springs being properly positioned, and the links 16 having been passed through the slots in the rear follower plate 2, the front member 5 is pressed rearwardly, compressing the draft springs. During this movement, the links are held outwardly inclined, the rear ends being tapered to permit of so positioning the links, and when the parts have been moved rearwardly sufficiently to permit registry of the tongues 19 with the slots 20, the links 16 are moved inwardly to their normal positions, when the front follower plate 1 can then be slipped into position. After thus assembling the parts, the links may be connected to the draw-bar 18 by inserting the key 17.

In operation, when the draw-bar is subjected to a buffing stress, the front plunger 8 is moved rearwardly so that through the engagement of the friction faces thereof with the corresponding friction faces of the friction blocks 7, causes the outward and rearward movement of the blocks, to the position shown in Fig. 2 of the drawing. The rear plunger 9 remains stationary, since there is a solid connection through the tubular member 10 to the rear follower plate 2, but the rear member 6 is displaced rearwardly, compressing the draft springs 11 and 12. The front member 5 is held against the block 7 during this movement, since the tongues 19 engage the front ends of the slots 20 to form a stop for said member. It will also be noted that the springs 13 and 14 are compressed by the action of the plunger 8 against the member 15. When the buffing stress is relieved, the release movement is facilitated by the action of the springs 13 and 14, which, being under compression, react, through the member 15, to push the front plunger 8 forward and thus relieve the blocks 7 of pressure, so that said blocks can readily move inwardly to the release position, shown in Fig. 3. Under a draft stress, the front follower plate 1 is held against forward movement by the stops 3 and this prevents movement of the front plunger 8. The front member 9 is held against the blocks 7, for although the links move forward with the rear follower plate 2, the front member 5 must also move with the links, since the tongues 19 engage the front ends of the slots 20 and consequently the compressive movement of the springs reacts on the front member 5 as though the same were held stationary. As the blocks 7 move outwardly during this movement, the rear member 6 is forced relatively to the rear, compressing the draft springs. In other words, during a draft stress, the parts will tend to assume the same relative positions as under a buffing stress, the only difference being that in the case of a draft stress, the rear follower will be moved forwardly away from the stop 4, while under a buffing stress, the front follower moves rearwardly. The release movement after a draft stress is facilitated by the action of the springs 13 and 14 against the tubular member 10, which tends to permit the rear plunger 9 to fall away from the blocks 7. The engaging faces of the members 10 and 15 may be made on the ball and socket principle, so as to allow a certain amount of adjustment of parts to compensate for any unevenness in the parts.

In order to permit the tongues 19 to be of ample strength, the member 5 may be extended rearwardly at the central portion, while the rear member 6 is correspondingly reduced at the central portion, as clearly shown in Fig. 1, so that the tongues 19 which must act substantially as stops can be longitudinally extended as shown. The tongues 21 merely act as guides and supports for the rear member 6, so that these tongues can be made comparatively narrow. By tying the front friction element to the rear follower the friction members are held in engagement under stress and at the same time the draft springs can be placed under initial compression.

While the function of a draft gear is to absorb and dissipate shocks, it is desirable, especially on long trains, to have a sufficient release power to insure that the draft gear parts will return to release position, as otherwise the gear may be driven solid by successive blows before the gear can recover and thus render it difficult to start the train, since there would be no slack therein. It will thus be seen that by providing means for facilitating the release, the effectiveness of the gear is increased.

While separate members might be employed for connecting the front friction element 5 to the follower 2, it will be noted that in the construction shown, the usual links which connect the rear follower to the draw-bar for transmitting draft stresses to the draft gear, are utilized for that purpose, thus simplifying the mechanism.

Having now described my invention, what I claim as new and desire to secure by Letters Patent, is:

1. In a friction draft gear, the combination with friction elements having oppositely inclined friction faces, centrally disposed plunger wedges having oppositely inclined friction faces, wedge blocks having friction faces for engaging the friction faces of the friction elements and the plunger wedges, a follower plate, and a yielding resistance interposed between said follower plate and one of said friction elements, of means connected to the follower plate for limiting the movement of the other friction element.

2. In a friction draft gear, the combination with friction elements having oppositely inclined friction faces, centrally disposed plunger wedges having oppositely inclined friction faces, wedge blocks having friction faces for engaging the friction faces of the friction elements and the plunger wedges, a follower plate, and a yielding resistance interposed between said follower plate and one of said friction elements, of means for preventing relative movement of the other friction element with respect to the follower plate.

3. In a friction draft gear, the combination with friction elements having oppositely inclined friction faces, centrally disposed plunger wedges having oppositely inclined friction faces, wedge blocks having friction faces for engaging the friction faces of the friction elements and the plunger wedges, a follower plate, and a yielding resistance interposed between said follower plate and one of said friction elements, of members connected to the follower plate and projections carried by the other friction element for engaging slots in said members.

4. In a friction draft gear, the combination with friction elements having oppositely inclined friction faces, centrally disposed plunger wedges having oppositely inclined friction faces, wedge blocks having friction faces for engaging the friction faces of the friction elements and the plunger wedges, a follower plate, and a yielding resistance interposed between said follower plate and one of said friction elements, of members connected to the follower plate and projections carried by the other friction element for engaging slots in said members, the engagement of the projections in the slots being adapted to hold the draft springs under an initial compression.

5. In a friction draft gear, the combination with a front and a rear follower, front and rear friction elements each having oppositely inclined friction faces, opposed central wedges having oppositely inclined friction faces, wedge blocks having friction faces adapted to engage the friction faces of the front and rear friction elements and the central wedges, and draft springs interposed between the rear friction element and the rear follower, the front follower having engagement on opposite sides with the draw-bar and one of the central wedges, of means for operatively connecting the rear follower with the front friction element.

6. In a friction draft gear, the combination with friction elements having oppositely inclined friction faces, opposed central wedges having oppositely inclined friction faces, and wedge blocks having friction faces adapted to engage the friction faces of the friction elements and central wedges, of a release spring device adapted to act on one of the central wedges to facilitate the release of the gear.

7. In a friction draft gear, the combination with friction elements having oppositely inclined friction faces, opposed central wedges having oppositely inclined friction faces, and wedge blocks having friction faces adapted to engage the friction faces of the friction elements and central wedges, of a release spring adapted to be compressed under a draft or buffing stress by the relative movement of the central wedges and to exert its force on one of the central wedges in the release movement of the gear.

8. In a friction draft gear, the combination with friction elements having oppositely inclined friction faces, a front and a rear follower, opposing central wedges having oppositely inclined friction faces, the front central wedge engaging the front follower and the rear central wedge having a tubular connection engaging the rear follower, and wedge blocks having friction faces for engaging the friction faces of the friction elements and the central wedges, of a yielding resistance mounted in the tubular connection of the rear central wedge and operatively connected to the front central wedge.

9. In a friction draft gear, the combination with friction elements having oppositely inclined friction faces, centrally disposed plunger wedges having oppositely inclined friction faces, wedge blocks having friction faces for engaging the friction faces of the friction elements and the plunger wedges, a follower plate, and a yielding resistance interposed between said follower plate and one of said friction elements, of links for connecting said follower plate to the draw-bar, said links being adapted to act as stops for preventing relative movement of the other friction element with respect to the follower plate.

10. In a friction draft gear, the combination with friction elements having oppositely inclined friction faces, centrally disposed plunger wedges having oppositely inclined friction faces, wedge blocks having friction faces for engaging the friction faces of the friction elements and the plunger wedges, a follower plate, and a yielding resistance interposed between said follower plate and one of said friction elements, of links for transmitting draft stresses from the draw-bar to said follower plate, the other friction element having projections adapted to engage slots in said links for preventing relative movement of said friction element with respect to said follower.

In testimony whereof I have hereunto set my hand.

EDWARD W. NEWELL.

Witnesses:
  A. M. CLEMENTS,
  B. A. OLIVER.